(12) United States Patent
Miller

(10) Patent No.: US 8,205,830 B2
(45) Date of Patent: Jun. 26, 2012

(54) HYDRAULIC FLUID CONTROL APPARATUS

(75) Inventor: Richard John Miller, Coventry (GB)

(73) Assignee: Meggitt Aerospace Limited (GB)

( * ) Notice: Subject to any disclaimer, the term of this patent is extended or adjusted under 35 U.S.C. 154(b) by 582 days.

(21) Appl. No.: 11/568,822

(22) PCT Filed: May 10, 2005

(86) PCT No.: PCT/GB2005/001753
§ 371 (c)(1),
(2), (4) Date: Apr. 24, 2007

(87) PCT Pub. No.: WO2005/110828
PCT Pub. Date: Nov. 24, 2005

(65) Prior Publication Data
US 2007/0210208 A1     Sep. 13, 2007

(30) Foreign Application Priority Data
May 12, 2004  (GB) .................................. 0410620.9

(51) Int. Cl.
*B60T 8/32*     (2006.01)
*B64C 25/46*    (2006.01)

(52) U.S. Cl. ................. 244/110 A; 244/103 R; 303/155

(58) Field of Classification Search .............. 244/100 R, 244/103 R, 102 R, 102 A, 110 R, 111, 110 A, 244/110 H; 303/126, 155
See application file for complete search history.

(56) References Cited

U.S. PATENT DOCUMENTS

| | | | |
|---|---|---|---|
| 3,948,569 A | * | 4/1976 | Gentet et al. .................. 303/159 |
| 4,043,607 A | * | 8/1977 | Signorelli et al. ............. 303/112 |
| 4,412,291 A | | 10/1983 | Amberg et al. |
| 4,457,967 A | * | 7/1984 | Chareire et al. .............. 428/212 |
| 4,610,484 A | | 9/1986 | Amberg et al. |

(Continued)

FOREIGN PATENT DOCUMENTS

| | | |
|---|---|---|
| EP | 0309074 A2 | 3/1989 |
| EP | 0329373 A1 | 8/1989 |
| EP | 0936116 A2 | 8/1999 |
| EP | 1080009 B1 | 3/2001 |

OTHER PUBLICATIONS

International Search Report dated Aug. 29, 2005 for Application No. PCT/GB2005/001753.

*Primary Examiner* — Tien Dinh
*Assistant Examiner* — Michael Kreiner
(74) *Attorney, Agent, or Firm* — Renner, Kenner, Greive, Bobak, Taylor & Weber

(57) ABSTRACT

In the field of avionics, it is difficult to justify initiation of new aircraft programmes for replacement of small numbers of niche aircraft. Instead, in many cases, retrofitting existing aircraft is preferred for economic reasons. In this respect, upgrading existing braking systems to accommodate replacement of existing brake units employing sintered friction materials with brake units employing carbon-carbon composite friction materials is desirable. However, when upgrading the braking systems it is necessary to ensure that the integrity of the existing airframe is not compromised by the use of the new brake assemblies employing the carbon-carbon composite friction materials. Consequently, the present invention replaces existing pressure control valves of existing braking systems with an electronic control unit (126) coupled to a pressure control servovalve (128) thereby ensuring proper application of hydraulic pressure to brake assemblies (122). An advantage of this invention is that the pressure profile of the hydraulic fluid is controllable and hence the integrity of the airframe is maintained.

9 Claims, 3 Drawing Sheets

U.S. PATENT DOCUMENTS

| | | | |
|---|---|---|---|
| 4,775,195 A * | 10/1988 | Miller | 303/122.07 |
| 4,822,113 A | 4/1989 | Amberg et al. | |
| 5,081,297 A * | 1/1992 | Lebel et al. | 710/104 |
| 5,180,214 A * | 1/1993 | Yeh et al. | 303/168 |
| 6,068,212 A * | 5/2000 | Ash et al. | 244/54 |
| 7,252,263 B1 * | 8/2007 | Hagemeister et al. | 244/1 R |
| 7,786,937 B1 * | 8/2010 | Stierhoff et al. | 343/700 MS |
| 2010/0170995 A1 * | 7/2010 | Maenz | 244/131 |
| 2010/0288244 A1 * | 11/2010 | Bulin et al. | 123/557 |

* cited by examiner

HYDRAULIC FLUID CONTROL APPARATUS

BACKGROUND OF THE INVENTION

The present invention relates to a hydraulic fluid control apparatus of the type used, for example, in a braking system for an aircraft.

The high cost of aircraft development means that development programs for new aircraft need high production numbers and/or selling price to justify investment levels required. In the aviation industry, there are many niche applications for small numbers of aircraft, making investment in a new aircraft difficult to justify. However, aging aircraft that currently fill many of these niche functions are operating with equipment that can be obsolete or inefficient, because of the outdated technology employed. Such equipment can include engines and ancillary equipment, avionics, landing gear and control systems.

An increasing trend in aviation is the updating of proven airframe designs with modern equipment to provide an updated, more efficient aircraft that utilises current technology without the cost associated with development of a completely new aircraft. Some older airframes that are now being refurbished and re-equipped for a new life span were originally designed for braking systems employing sintered friction materials. These aircraft are now being equipped with modern braking systems. An example of such an aircraft is the Nimrod MRA4 built by BAE Systems Limited of Great Britain. However, one drawback of this approach is the accommodation of the performance parameters of new modern systems by the existing airframe, in particular the torque generated by a braking system.

In this respect, the modern aircraft braking systems are designed around the use of carbon-carbon composite friction materials that have a significantly higher peak torque during a braking cycle than sintered materials. Consequently, if the brake torque builds too quickly and/or exceeds certain threshold values when the brake is applied, it is possible to cause damage to the airframe.

Brake control on aircraft employing such airframes refurbished with braking systems using carbon-carbon composite friction materials has been carried out by the use of complex systems within hydro-mechanical brake pressure control valves to control brake torque and avoid damage to the airframe. Typically, a pressure reducing valve, under the control of a utilities systems management system, feeds hydraulic fluid under pressure to brake metering valves, anti-skid valves and hydraulic fuses downstream of the pressure reducing valve. The pressure reducing valve builds a pressure profile in response to a brake signal received by the pressure reducing valve, the pressure to the brakes being increased over a predetermined time from a starting pressure to some peak value during braking until the pressure is then released after the required brake application has been completed. The functionality of the pressure reducing valve is provided mechanically by, for example, the use of a restrictor to limit the flow of hydraulic fluid and an accumulator, a build-up of pressure being dependent on the restrictor size and accumulator volume.

SUMMARY OF THE INVENTION

According to a first aspect of the present invention a hydraulic fluid control apparatus for replacing a pressure reducing valve of a braking system, the apparatus comprising: a processing unit for receiving an input signal and generating an electrical control signal in response thereto; and means for variably controlling a hydraulic output in response to the electrical control signal, the means for variably controlling the hydraulic output being coupled to the processing unit.

Preferably, the first control signal corresponds to a demand, when in use, for braking. More preferably, the processing unit is arranged to generate the control signal within predetermined parameters irrespective of the input signal corresponding to the demand for braking.

Preferably, the control signal is configurable.

The processing unit and/or the means for variably controlling the hydraulic output may be powered by the input signal.

The means for variably controlling the hydraulic output may be a servovalve. The means for variably controlling the hydraulic output may be arranged to control, when in use, hydraulic pressure and/or hydraulic flow.

According to a second aspect of the present invention, there is provided a braking control system comprising the hydraulic fluid control apparatus as set forth above in relation to the first aspect of the invention.

According to a third aspect of the present invention, there is provided a vehicle comprising the hydraulic fluid control apparatus as set forth above in relation to the first aspect of the invention.

According to a fourth aspect of the present invention, there is provided an aircraft comprising the hydraulic fluid control apparatus as set forth above in relation to the first aspect of the invention.

According to a fifth aspect of the present invention, there is provided a method of upgrading a braking system, the method comprising the steps of: fluidly coupling between a source of hydraulic fluid under pressure and a braking assembly a means for variably controlling a hydraulic output in response to an electrical control signal, the means for variably controlling the fluid output being provided in place of a pressure reducing valve; providing a processing unit for receiving, when in use, an input signal and generating the electrical control signal in response thereto, and coupling the processing unit to the means for variably controlling the hydraulic output; wherein the processing unit is arranged to control, when in use, supply from the means for variably controlling the hydraulic output in response to the control signal.

It is thus possible to provide a hydraulic fluid control apparatus having reduced complexity of mechanical components, whilst delivering a required progressive increase in pressure up to a defined maximum pressure. Additionally, by generating a progressive increase in pressure and maximum pressure limit that overrides a rate of brake demand called by a pilot of an aircraft within limits that are calculated to be acceptable to an airframe, improved safety is achieved. A further benefit of the above apparatus is additional flexibility to be able to adjust a characteristic ramp rate by reselection of electronic components and/or reprogramming of one or more component, and to adjust the pressure levels generated at the servovalve current limits by adjustment of the apparatus. Furthermore, it is not necessary to provide additional sources of electrical power in order to drive the apparatus.

BRIEF DESCRIPTION OF SEVERAL VIEWS OF THE DRAWINGS

At least one embodiment of the invention will now be described, in a non-limiting manner by way of example only and with reference to the following drawings, in which.

DETAILED DESCRIPTION OF THE PREFERRED EMBODIMENTS

Figure 1A:
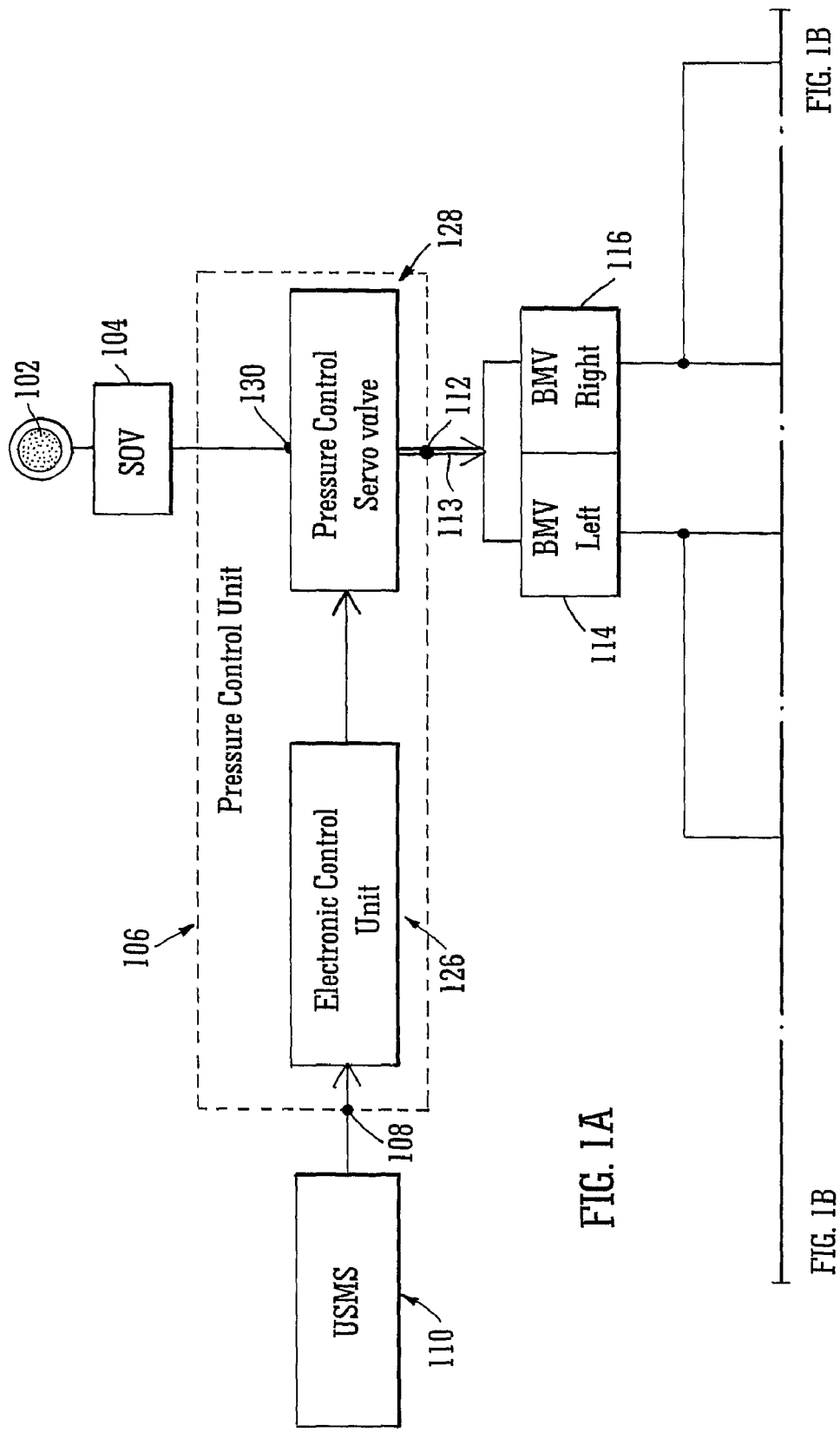
FIG. 1 is a schematic diagram of a braking system comprising an apparatus constituting an embodiment of the invention.
Figure 1B:
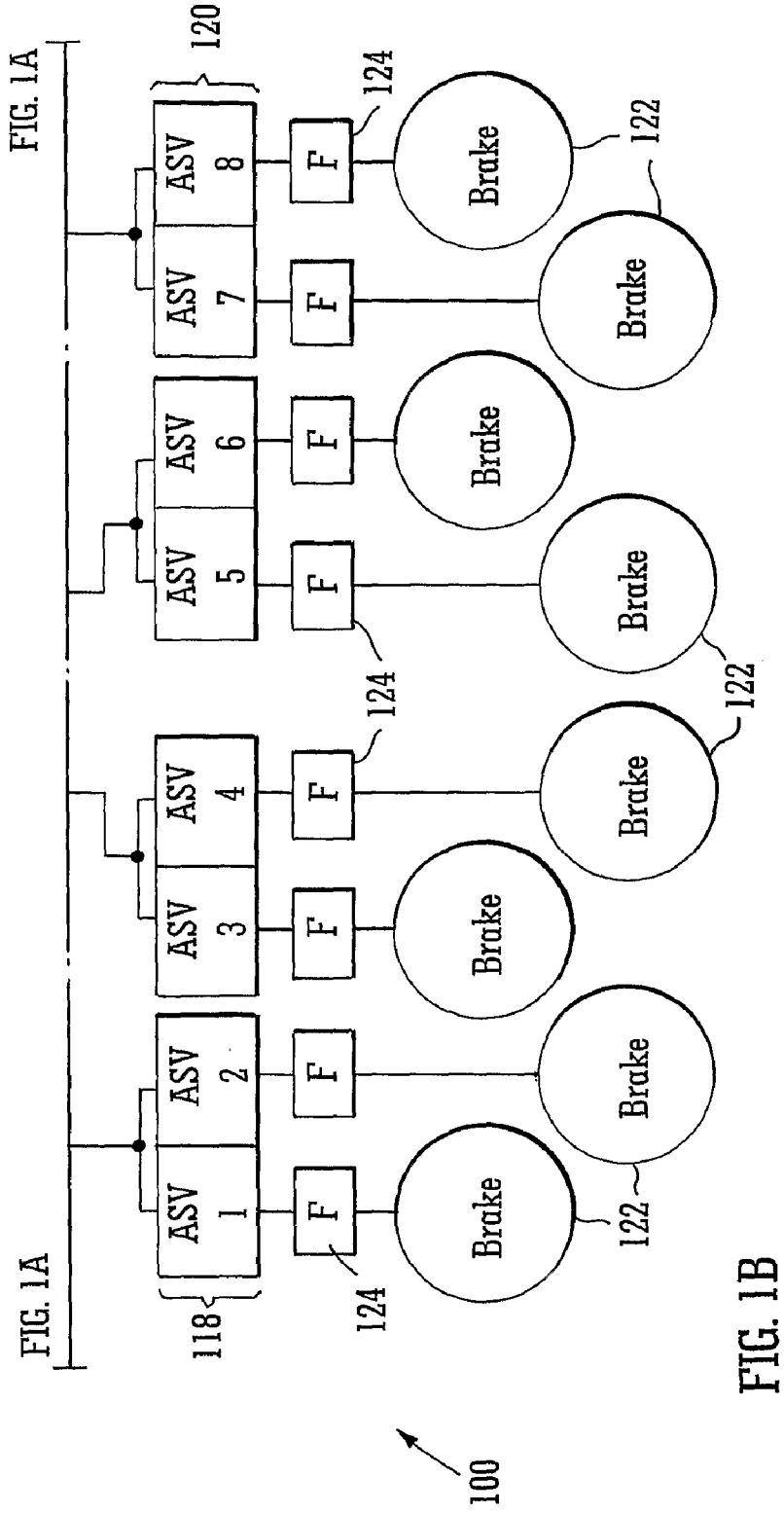

Referring to FIG. 1, a braking system 100 comprises a source of hydraulic pressure 102 coupled to a Shut-Off Valve (SOV) 104, the SOV 104 being coupled to a Pressure Control Unit (PCU) 106. The PCU 106 comprises a suitably programmed processing unit, which is schematically identified as the Electronic Control Unit 126 in FIG. 1A, coupled to a Utility Systems Management System (USMS) 110 via an input 108. However, it should be appreciated that the programmed processing unit can be replaced by other electronic circuitry and/or software. A hydraulic fluid output port 112 is coupled to a first Brake Metering Valve (BMV) 114 and a second BMV 116 by a brake systems hydraulic line 113, the first and second BMVs 114, 116 being coupled to a first set of Anti-Skid Valves (ASVs) 118 and a second set of ASVs 120, respectively. Each ASV 120 is coupled to a corresponding brake assembly 122 via a respective hydraulic fuse 124.

The PCU 106 comprises an Electronic Control Unit (ECU) 126 having an input constituting the input 108 of the PCU 106, and an output coupled to an input of a Pressure Control Servovalve (PCS) 128. The PCS 128 has an input port 130, constituting a hydraulic fluid input port of the PCU 106, and an output port constituting the hydraulic fluid output port 112.

In this example, the ECU 126 and the PCS 128 are formed as a single unit, namely the PCU 106. However, it should be appreciated that the ECU 126 and PCS 128 can be provided as separate units.

Figure 2A:
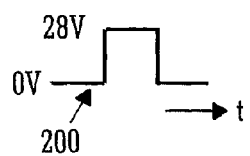
FIGS. 2A to 2D are schematic diagrams of signal and pressure profiles.

In operation (FIG. 2), a braking demand originates, for example, from a pilot. The braking demand is translated into an electrical braking demand signal. The braking demand signal is received by the USMS 110 in addition to other signals representative of factors pertinent to braking, for example: aircraft weight and/or speed. In this respect, the USMS 110 executes a number of algorithms in order to generate a brake trigger signal 200 (FIG. 2A) that is received by the ECU 126 via the input 108. In this example, the PCU 106 derives electrical power from the brake trigger signal 200.

Figure 2D:
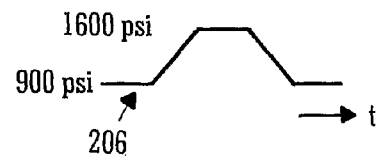
Figure 2B:
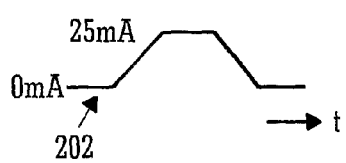
Figure 2C:
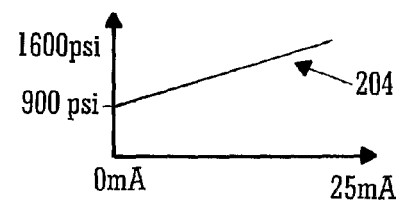

In response to the brake trigger signal 200, the ECU 126 processes the brake trigger signal 200 using a suitable control algorithm stored in the ECU 126 in order to generate a brake pressure demand signal 202 (FIG. 2B) that is received by the PCS 128. Upon receiving the brake pressure demand signal 202, the PCS 128 actuates in accordance with the brake pressure demand signal 202 to apply pressure to the brake system hydraulic line 113 via the output port 112; the pressure profile applied to the braking system hydraulic line 113 follows a predetermined pressure vs. electrical input signal profile 204 (FIG. 2C) of the PCS 128 to yield a brake pressure 206 (FIG. 2D).

Consequently, the brake assemblies 202 effect braking to slow the aircraft within acceptable mechanical parameters of the airframe of the aircraft, thereby avoiding compromising integrity of the airframe.

If desired, the profile of the brake pressure demand signal 202, and hence the profile of the brake pressure 206, can be easily modified by re-programming the ECU 126 and/or modifying at least one component of the ECU 126.

In this example, the ECU 126 is programmed so that, irrespective of the brake demand made by the pilot, the translation of the brake demand by the pilot into the brake pressure 206 is overridden, when necessary, by the ECU 126 in order to avoid the profile of the brake pressure 206 deviating outside, or crossing one or more threshold corresponding to, predetermined pressure profile limits, thereby maintaining airframe integrity if the pilot issues an unacceptable braking demand.

The invention claimed is:

1. An aircraft braking system hydraulic fluid control apparatus for replacing a pressure reducing valve of an aircraft braking system, the apparatus comprising:
    electrical control circuitry for receiving an input signal representative of a hydraulic brake demand from a user of an aircraft to which the system is fitted in use and generating an electrical control signal in response thereto; and
    hydraulic control means for variably controlling a hydraulic braking output in response to the electrical control signal, the hydraulic control means for variably controlling the hydraulic braking output being coupled to the electrical control circuitry for receiving said electrical control signal, the hydraulic control means arranged to apply the hydraulic braking output to one or more brake assemblies;
    wherein said electrical control circuitry is operable such that on receipt of a braking demand signal corresponding to a hydraulic output profile that would exceed acceptable mechanical parameters of the airframe to which the braking system is fitted, in use, it generates an electrical control signal profile irrespective of said input signal, to cause said hydraulic control means to provide the hydraulic braking output of a predetermined hydraulic output profile within acceptable mechanical parameters of the airframe.

2. An apparatus as claimed in claim 1, wherein said electrical control circuitry comprises an electronic control unit.

3. An apparatus as claimed in claim 2, wherein said electronic control unit is a programmable processing unit, whereby the electrical control signals generated are configurable by reprogramming the processing unit such that the hydraulic output from the means for variably controlling a hydraulic output can be adjusted by reprogramming the processing unit.

4. An apparatus as claimed in claim 1, wherein the electrical control circuitry is an open loop control that generates said electrical control signal without feedback concerning the hydraulic output.

5. An apparatus as claimed in claim 1, wherein at least one of the control circuitry and the hydraulic control means is powered by the input signal.

6. An apparatus as claimed in claim 1, wherein the hydraulic control means for is a servovalve.

7. An apparatus as claimed in claim 1, wherein the hydraulic control means is arranged to control, when in use, at least one of hydraulic pressure and hydraulic flow.

8. An aircraft braking system comprising an aircraft braking system hydraulic fluid control apparatus as claimed in claim 1.

9. An aircraft comprising an aircraft braking system as claimed in claim 8.

* * * * *